United States Patent
Shibata et al.

(10) Patent No.: US 10,074,875 B2
(45) Date of Patent: Sep. 11, 2018

(54) PROTECTION CIRCUIT FOR SECONDARY BATTERY, BATTERY PROTECTION MODULE, BATTERY PACK, AND METHOD

(71) Applicants: Kohei Shibata, Tokyo (JP); Hibiki Yano, Tokyo (JP)

(72) Inventors: Kohei Shibata, Tokyo (JP); Hibiki Yano, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 226 days.

(21) Appl. No.: 14/542,720

(22) Filed: Nov. 17, 2014

(65) Prior Publication Data
US 2015/0145484 A1    May 28, 2015

(30) Foreign Application Priority Data
Nov. 25, 2013  (JP) .................. 2013-242991

(51) Int. Cl.
*H01M 10/42* (2006.01)
*H02H 7/18* (2006.01)
(Continued)

(52) U.S. Cl.
CPC ....... *H01M 10/4257* (2013.01); *H01M 10/44* (2013.01); *H02H 7/18* (2013.01);
(Continued)

(58) Field of Classification Search
CPC .... H01M 10/4257; H01M 10/44; H02H 7/18; H02J 7/0031; H02J 7/047; H02J 2007/0037
(Continued)

(56) References Cited

U.S. PATENT DOCUMENTS 5,634,537 A  *  6/1997  Thorn ............... A47C 1/03
                                                  188/300
5,764,033 A  *  6/1998  Tamai ............ G01R 31/3648
                                                  320/132
(Continued)

FOREIGN PATENT DOCUMENTS

JP    2008-042964      2/2008
JP       5110168      12/2012

OTHER PUBLICATIONS

English Machine Translation of WO2010/035595A1.*
Japanese Office Action for 2013-242991 dated Jun. 13, 2017.

*Primary Examiner* — Richard Isla Rodas
*Assistant Examiner* — Manuel Hernandez
(74) *Attorney, Agent, or Firm* — IPUSA, PLLC

(57) ABSTRACT

A protection circuit for protecting a secondary battery includes a controller that closes a charging path for charging the secondary battery with a charger when a charge preventing condition is satisfied, the charging path being between a terminal of the secondary battery and an input-output terminal for connecting the charger and an electronic apparatus, opens the charging path when a discharging current from the secondary battery to the electronic apparatus is detected while the charge preventing condition is satisfied and the charging path is closed, and temporarily closes the charging path when a predetermined period of time passes after the charging path is opened, to determine whether the discharging current is flowing.

6 Claims, 7 Drawing Sheets

(51) Int. Cl.
  *H02J 7/04* (2006.01)
  *H01M 10/44* (2006.01)
  *H02J 7/00* (2006.01)

(52) U.S. Cl.
  CPC ............ *H02J 7/0031* (2013.01); *H02J 7/047* (2013.01); *H02J 2007/0037* (2013.01)

(58) Field of Classification Search
  USPC ........................................................ 320/134
  See application file for complete search history.

(56) References Cited

U.S. PATENT DOCUMENTS

| | | | | |
|---|---|---|---|---|
| 5,990,663 | A * | 11/1999 | Mukainakano | H02J 7/0068 320/134 |
| 6,222,346 | B1 * | 4/2001 | Mori | H02J 7/0031 320/134 |
| 6,313,610 | B1 * | 11/2001 | Korsunsky | H01M 10/48 320/134 |
| 2007/0013342 | A1 * | 1/2007 | Suzuki | H02J 7/0031 320/112 |
| 2009/0202890 | A1 * | 8/2009 | Takeda | H01M 2/34 429/62 |
| 2010/0176768 | A1 * | 7/2010 | Kimura | H01M 10/443 320/152 |
| 2013/0049697 | A1 * | 2/2013 | Li | H02J 7/0031 320/134 |

* cited by examiner

PROTECTION CIRCUIT FOR SECONDARY BATTERY, BATTERY PROTECTION MODULE, BATTERY PACK, AND METHOD

CROSS-REFERENCE TO RELATED APPLICATION

The present application is based upon and claims the benefit of priority of Japanese Patent Application No. 2013-242991, filed on Nov. 25, 2013, the entire contents of which are incorporated herein by reference.

BACKGROUND OF THE INVENTION

1. Field of the Invention

An aspect of this disclosure relates to a protection circuit for a secondary battery, a battery protection module, a battery pack, and a method.

2. Description of the Related Art

Electronic apparatuses driven by a battery pack including a secondary battery have become popular, and various proposals have been made for configurations of battery packs (see, for example, Japanese Patent No. 5110168).

FIG. 6A through 6C are schematic diagrams illustrating a configuration of an exemplary related-art battery pack 640. As illustrated by FIG. 6A, the battery pack 640 includes a secondary battery 641, input-output terminals 642 and 643 that are connected to an electronic apparatus 650 and/or a battery charger, a thermistor 644 for detecting a temperature of the secondary battery 641, and a battery protection module 630. The battery protection module 630 includes a semiconductor integrated circuit (IC) 610 used as a protection circuit for the secondary battery 641. The semiconductor integrated circuit 610 connects the cathode of the secondary battery 641 with the positive input-output terminal 642, and connects the anode of the secondary battery 641 with the negative input-output terminal 643.

Also, each of a first field-effect transistor (FET) 631 that is a switch for turning battery charging on and off and a second FET 632 that is a switch for turning battery discharging on and off is connected in series to the semiconductor integrated circuit 610.

The configuration of the battery pack 640 of FIG. 6A, for example, makes it possible to prevent charging of the secondary battery 641 by turning off the first FET 631 when the temperature of the secondary battery 641 becomes greater than or equal to a predetermined threshold, and thereby makes it possible to prevent the secondary battery 641 from heating up.

Here, assume a case where the electronic apparatus 650 driven by the battery pack 640 is a power tool, and the battery pack 640 is connected to drive the power tool while the temperature of the secondary battery 641 is greater than or equal to the predetermined threshold and charging of the secondary battery 641 is prevented. In this case, because the temperature of the secondary battery 641 is greater than or equal to the predetermined threshold, the secondary battery 641 discharges electricity with the first FET 631 turned off.

When the first FET 631 is off, electricity is discharged via a parasitic diode 631d of the first FET 631 (see a dotted arrow line in FIG. 6B). As a result, the power consumption of the first FET 631 increases and the first FET 631, which is a switch, heats up.

To discharge electricity without using the parasitic diode 631d of the first FET 631 when the first FET 631 is off, separate paths may be provided for charging and discharging as illustrated by FIG. 6C. However, this approach makes it necessary to change the system (or configuration) of the electronic apparatus 650 and therefore increases costs.

For the above reasons, there is a demand for a battery pack with a configuration that can prevent heat-up resulting from discharging even when the battery pack is connected to an electronic apparatus while charging of the secondary battery is prevented due to heat-up of the secondary battery, and that does not require changing the system (or configuration) of the electronic apparatus.

SUMMARY OF THE INVENTION

In an aspect of this disclosure, there is provided a protection circuit for protecting a secondary battery. The protection circuit includes a controller that closes a charging path for charging the secondary battery with a charger when a charge preventing condition is satisfied, the charging path being between a terminal of the secondary battery and an input-output terminal for connecting the charger and an electronic apparatus, opens the charging path when a discharging current from the secondary battery to the electronic apparatus is detected while the charge preventing condition is satisfied and the charging path is closed, and temporarily closes the charging path when a predetermined period of time passes after the charging path is opened, to determine whether the discharging current is flowing.

DESCRIPTION OF THE PREFERRED EMBODIMENTS

Embodiments of the present invention are described below with reference to the accompanying drawings. In the specification and the drawings of the present application, the same reference number is assigned to components having substantially the same function, and repeated descriptions of those components are omitted.

First Embodiment

Configuration of Battery Pack (1) Battery Pack

Figure 1:
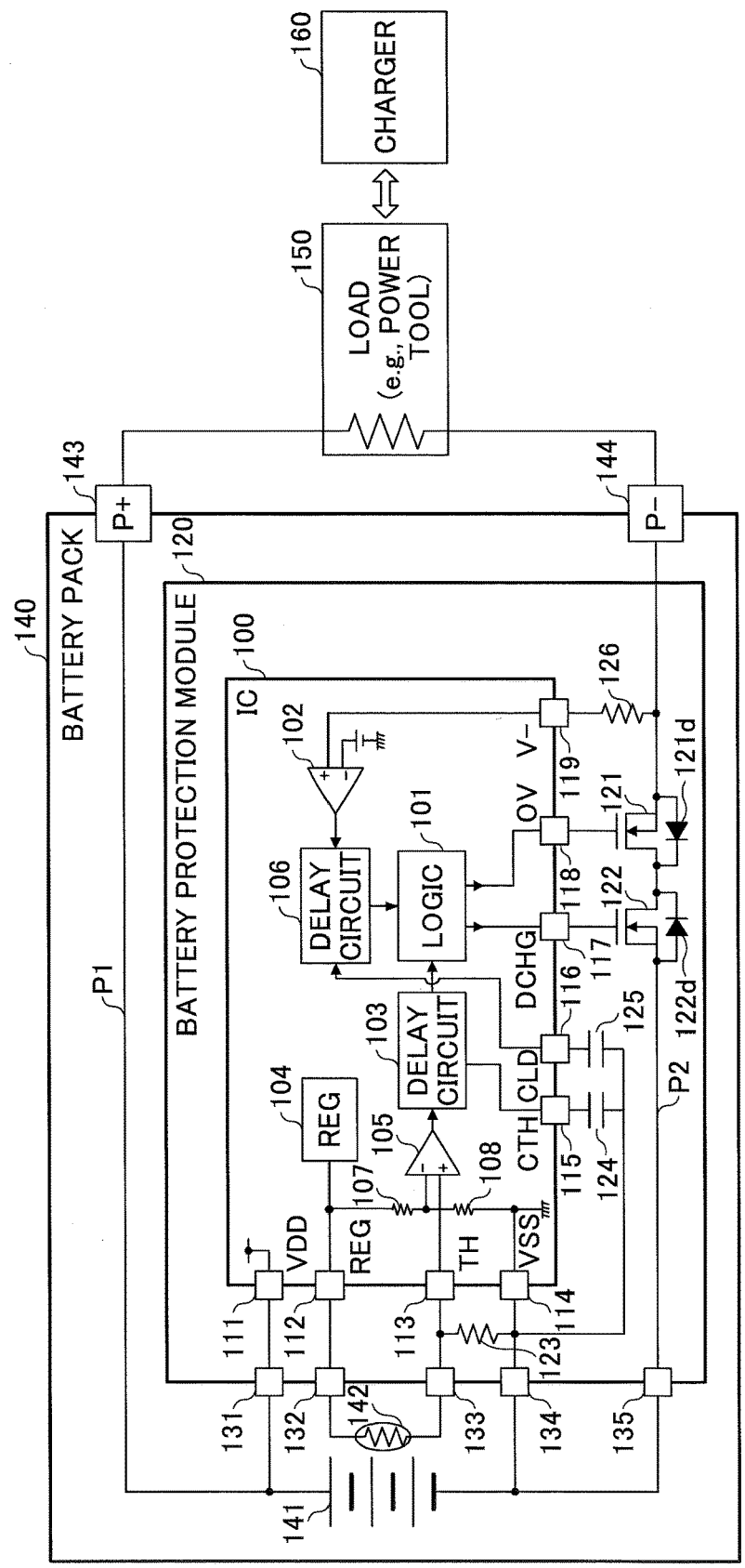
FIG. 1 is a drawing illustrating an exemplary configuration of a battery pack.

FIG. 1 is a drawing illustrating an exemplary configuration of a battery pack 140 according to an embodiment. As illustrated by FIG. 1, the battery pack 140 includes a secondary battery 141, a thermistor 142, positive and negative input-output terminals 143 and 144, and a battery protection module 120.

The secondary battery 141 may be implemented by, for example, a lithium-ion battery, a nickel-hydrogen battery, or an electric double layer capacitor. The thermistor 142 detects a temperature of the secondary battery 141. The input-output terminals 143 and 144 are connectors used to supply power (i.e., discharging electricity) from the secondary battery 141 to a load 150 (an electronic apparatus such as a power tool), and to charge the secondary battery 141 by a charger 160.

(2) Battery Protection Module

The battery protection module 120 includes NMOS transistors 121 and 122 that function as switches for opening and closing charging-discharging paths P1 and P2 between the input-output terminals 143 and 144 and the terminals of the secondary battery 141. The battery protection module 120 also includes a semiconductor integrated circuit (IC) 100 that is a protection circuit for the secondary battery 141 and controls switching operations of the NMOS transistors 121 and 122. The battery protection module 120 includes terminals 131 through 135. The semiconductor integrated circuit 100 includes terminals 111 through 119. The terminals of the secondary battery 141, the terminals of the thermistor 142, and the charging-discharging paths P1 and P2 are connected to the corresponding terminals 111 through 119, via the terminals 131 through 135, resistors 123 and 126, capacitors 124 and 125, and the NMOS transistors 121 and 122 as illustrated in FIG. 1.

The NMOS transistors 121 and 122 are connected in series to open and close the charging-discharging path P2 between the anode of the secondary battery 141 and the negative input-output terminal 144. In the example of FIG. 1, the NMOS transistors 121 and 122 are provided between the anode of the secondary battery 141 and the negative input-output terminal 144. Alternatively, the NMOS transistors 121 and 122 may be provided between the cathode of the secondary battery 141 and the positive input-output terminal 143.

The NMOS transistor 121 is a switch for allowing and preventing the flow of a charging current for charging the secondary battery 141 that flows through the charging-discharging path P2 in a charging direction (i.e., for opening and closing a charging path). On the other hand, the NMOS transistor 122 is a switch for allowing and preventing the flow of a discharging current from the secondary battery 141 that flows through the charging-discharging path P2 in a discharging direction (i.e., for opening and closing a discharging path).

When the NMOS transistor 121 is turned on, charging of the secondary battery 141 is allowed, and when the NMOS transistor 121 is turned off, charging of the secondary battery 141 is prevented. Also, when the NMOS transistor 122 is turned on, discharging of the secondary battery 141 is allowed, and when the NMOS transistor 122 is turned off, discharging of the secondary battery 141 is prevented.

The NMOS transistor 121 includes a parasitic diode 121*d*, and is disposed between the anode of the secondary battery 141 and the negative input-output terminal 144 such that the forward direction of the parasitic diode 121*d* matches the discharging direction of the secondary battery 141. The NMOS transistor 122 includes a parasitic diode 122*d*, and is disposed between the anode of the secondary battery 141 and the negative input-output terminal 144 such that the forward direction of the parasitic diode 122*d* matches the charging direction of the secondary battery 141. Each of the NMOS transistors 121 and 122 may be implemented, for example, by an insulated gate bipolar transistor (IGBT) or a bipolar transistor including a parasitic diode disposed between the collector and the emitter and oriented in a proper direction.

(3) Semiconductor Integrated Circuit

The semiconductor integrated circuit (IC) 100 includes a regulator (REG) 104 that generates a voltage for driving the thermistor 142 whose resistance value varies depending on the temperature of the secondary battery 141. The semiconductor integrated circuit 100 also includes a comparator 105 that compares a voltage obtained by dividing the voltage of the regulator 104 using the thermistor 142 and the resistor 123 having no temperature characteristic with a voltage obtained by dividing the voltage of the regulator 104 using resistors 107 and 108 in the semiconductor integrated circuit 100.

The semiconductor integrated circuit 100 also includes a delay circuit 103 for delaying and outputting a signal from the comparator 105. Also, the semiconductor integrated circuit 100 includes a comparator 102 for detecting a discharging current that flows when the load 150 is connected to the input-output terminals 143 and 144, and a delay circuit 106 for delaying and outputting a signal from the comparator 102. Further, the semiconductor integrated circuit 100 includes a logic unit 101 (which may be referred to as a "controller") that controls signals (high level or low level) output from an OV terminal 118 and a DCHG terminal 117 based on the signals from the delay circuit 103 and the delay circuit 106, to turn respectively the NMOS transistors 121 and 122 on and off.

The delay circuit 103 delays a signal for a period of time taken by a voltage at a CTH terminal 115 to reach a predetermined threshold, and the delay circuit 106 delays a signal for a period of time taken by a voltage at a CLD terminal 116 to reach a predetermined threshold. The delay circuits 103 and 106 prevent false detections caused by noise.

The comparator 105 outputs a high (H) level signal when the voltage obtained by dividing the voltage of the regulator 104 with the thermistor 142 and the resistor 123 is greater than the voltage obtained by dividing the voltage of the regulator 104 with the resistors 107 and 108. Thus, the voltage obtained by dividing the voltage of the regulator 104 with the resistors 107 and 108 in the semiconductor integrated circuit 100 is used as a threshold (e.g., 50° C.) for temperature detection. In other words, a threshold for temperature detection is determined by the resistors 107 and 108 in the semiconductor integrated circuit 100.

The delay circuit 103 outputs, to the logic unit 101, a signal indicating that the temperature of the secondary battery 141 has become greater than or equal to a first threshold (e.g., 50° C.), when a predetermined delay time (temperature detection delay time) passes after a high (H) level signal is output from the comparator 105. Also, the delay circuit 103 outputs, to the logic unit 101, a signal indicating that the temperature of the secondary battery 141 has become less than a second threshold (e.g., 40°), when the predetermined delay time (temperature detection delay time) passes after a low (L) level signal is output from the comparator 105.

When a charge preventing condition for preventing charging of the secondary battery 141 is satisfied, the logic unit 101 turns off the NMOS transistor 121 to close the charging path. This configuration makes it possible to prevent a problem where a charging current for charging the secondary battery 141 flows regardless of whether the NMOS transistor 122 is on or off. When a discharge preventing condition for preventing discharging of the secondary battery 141 is satisfied, the logic unit 101 turns off the NMOS transistor 122 to close the discharging path. This configuration makes it possible to prevent a problem where a discharging current of the secondary battery 141 flows regardless of whether the NMOS transistor 121 is on or off.

The OV terminal 118 outputs a control signal for controlling the NMOS transistor 121. When the control signal from the OV terminal 118 is at the high level, the NMOS transistor 121 is turned on. On the other hand, when the control signal from the OV terminal 118 is at the low level, the NMOS transistor 121 is turned off.

Similarly, the DCHG terminal 117 outputs a control signal for controlling the NMOS transistor 122. When the control signal from the DCHG terminal 117 is at the high level, the NMOS transistor 122 is turned on. On the other hand, when the control signal from the DCHG terminal 117 is at the low level, the NMOS transistor 122 is turned off.

A V− terminal 119 is connected via the resistor 126 to the negative input-output terminal 144, and a voltage at the negative input-output terminal 144 is input to the V− terminal 119. When the load 150 is connected to the battery pack 140 and the voltage input to the V− terminal 119 becomes greater than a predetermined value due to the flow of the discharging current, the comparator 102 outputs a signal to the delay circuit 106.

The delay circuit 106 outputs, to the logic unit 101, a signal indicating that the load 150 is connected, when a predetermined delay time (first delay time) passes after the voltage input to the V− terminal 119 becomes greater than the predetermined value. Also, the delay circuit 106 outputs, to the logic unit 101, a signal indicating that a predetermined period of time has passed, when a predetermined delay time (second delay time) passes after the voltage input to the V− terminal 119 becomes greater than the predetermined value and then returns to a previous value.

Charge Preventing Condition

Next, a charge preventing condition for preventing charging of the secondary battery 141 is described. The charge preventing condition is defined, for example, in the logic unit 101 based on the temperature of the secondary battery 141.

For example, the logic unit 101 determines that a temperature condition for preventing charging of the secondary battery 141 is satisfied when a predetermined delay time passes after a high (H) level signal is output from the comparator 105. When the temperature condition is satisfied, the logic unit 101 changes an output signal of the OV terminal 118 to the low level to turn off the NMOS transistor 121. On the other hand, the logic unit 101 determines that the temperature condition for preventing charging of the secondary battery 141 is not satisfied when a predetermined delay time passes after a low (H) level signal is output from the comparator 105. When the temperature condition is not satisfied, the logic unit 101 changes the output signal of the OV terminal 118 to the high level to turn on the NMOS transistor 121.

Thus, the battery pack 140 of the present embodiment is configured to prevent charging of the secondary battery 141 based on a charge preventing condition that is a temperature condition. This configuration makes it possible to slow the deterioration of the secondary battery 141 that is caused when the secondary battery 141 is charged in a certain temperature range.

Control Modes of Logic Unit

Figure 2:
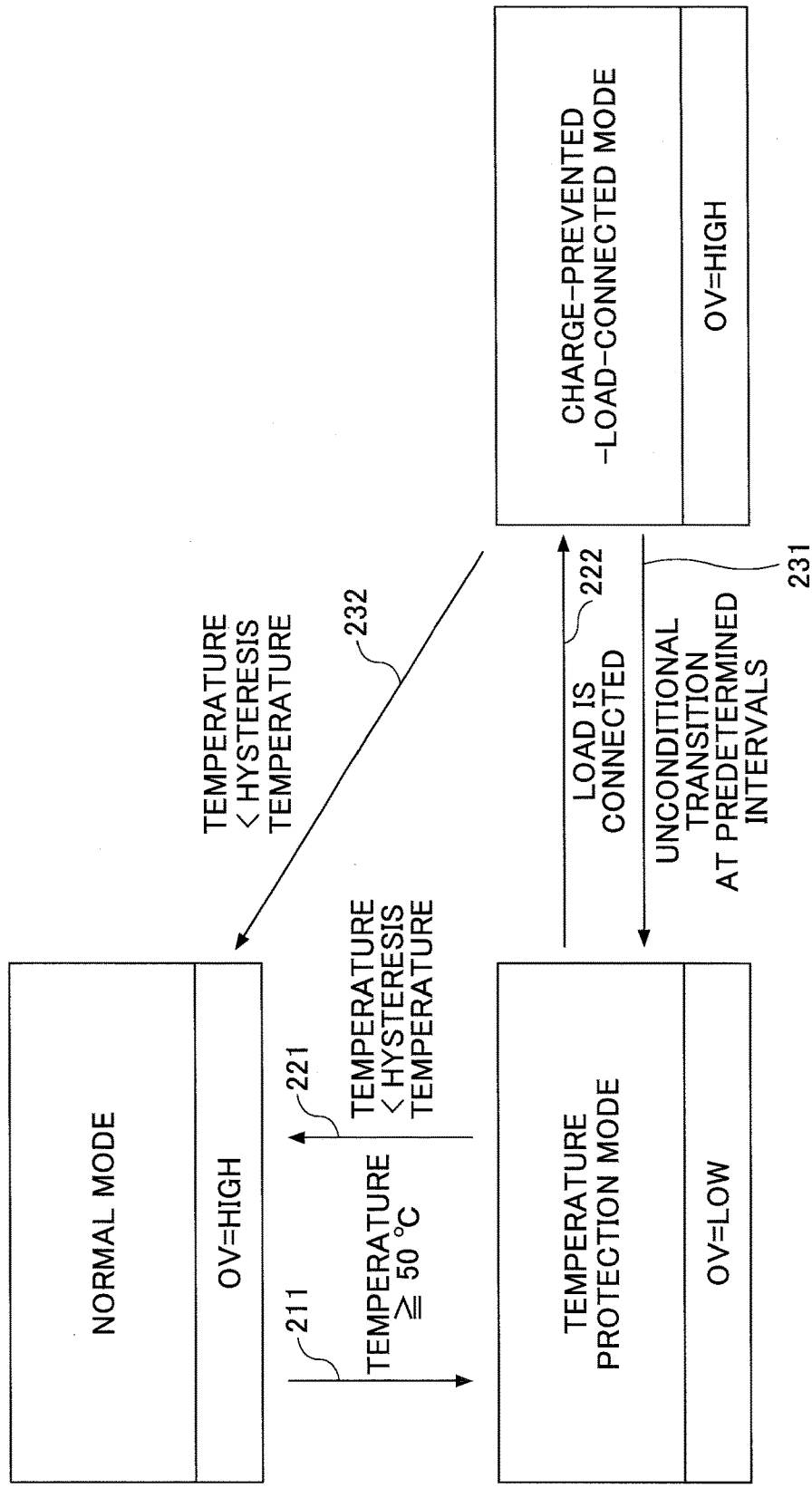
FIG. 2 is a drawing illustrating control modes of a semiconductor integrated circuit included in a battery protection module of a battery pack.

Next, control modes of the logic unit 101 are described. In the control modes, the logic unit 101 controls a signal (high level or low level) output from the OV terminal 118 to turn the NMOS transistor 121 on and off. FIG. 2 is a drawing illustrating the control modes of the logic unit 101.

As illustrated by FIG. 2, the control modes of the logic unit 101 include a normal mode, a temperature protection mode, and a charge-prevented-load-connected mode.

The logic unit 101 is in the normal mode when the temperature of the secondary battery 141 is less than the second threshold (e.g., 40° C.). In the normal mode, the output signal of the OV terminal 118 is at the high level.

The logic unit 101 transitions to the temperature protection mode (arrow 211) when the temperature of the secondary battery 141 becomes greater than or equal to the first threshold (e.g., 50° C.). In the temperature protection mode, the output signal of the OV terminal 118 is at the low level.

When the temperature of the secondary battery 141 becomes less than the second threshold (e.g., 40° C.) while the logic unit 101 is in the temperature protection mode, the logic unit 101 transitions to the normal mode (arrow 221), and the output signal of the OV terminal 118 is changed to the high level.

On the other hand, when the temperature of the secondary battery 141 remains greater than or equal to the second threshold (e.g., 40° C.) after the logic unit 101 transitions to the temperature protection mode, the logic unit 101 continues to be in the temperature detection mode, and the output signal of the OV terminal 118 remains at the low level.

The logic unit 101 transitions to the charge-prevented-load-connected mode (arrow 222) when the load 150 (an electronic apparatus such as a power tool) is connected to the battery pack 140 while the logic unit 101 is in the temperature protection mode. In the charge-prevented-load-connected mode, the output signal of the OV terminal 118 is at the high level.

Thus, according to the present embodiment, the output signal of the OV terminal 118 is changed to the high level even when the load 150 is connected while the logic unit 101 is in the temperature protection mode and the temperature condition for preventing charging of the secondary battery 141 is satisfied. This configuration makes it possible to prevent electricity from being discharged via the parasitic diode 121d, and thereby makes it possible to prevent heat-up of the battery pack 140 resulting from discharging.

When the predetermined delay time (the second delay time) passes after the logic unit 101 transitions to the charge-prevented-load-connected mode, the logic unit 101 transitions to the temperature protection mode (arrow 231), and the output signal of the OV terminal 118 is changed to the low level again.

When the temperature of the secondary battery 141 becomes less than the second threshold (e.g., 40° C.) while the logic unit 101 is in the charge-prevented-load-connected mode, the logic unit 101 transitions to the normal mode (arrow 232). In this case, the output signal of the OV terminal 118 remains at the high level.

Process in Battery Pack

Figure 3:
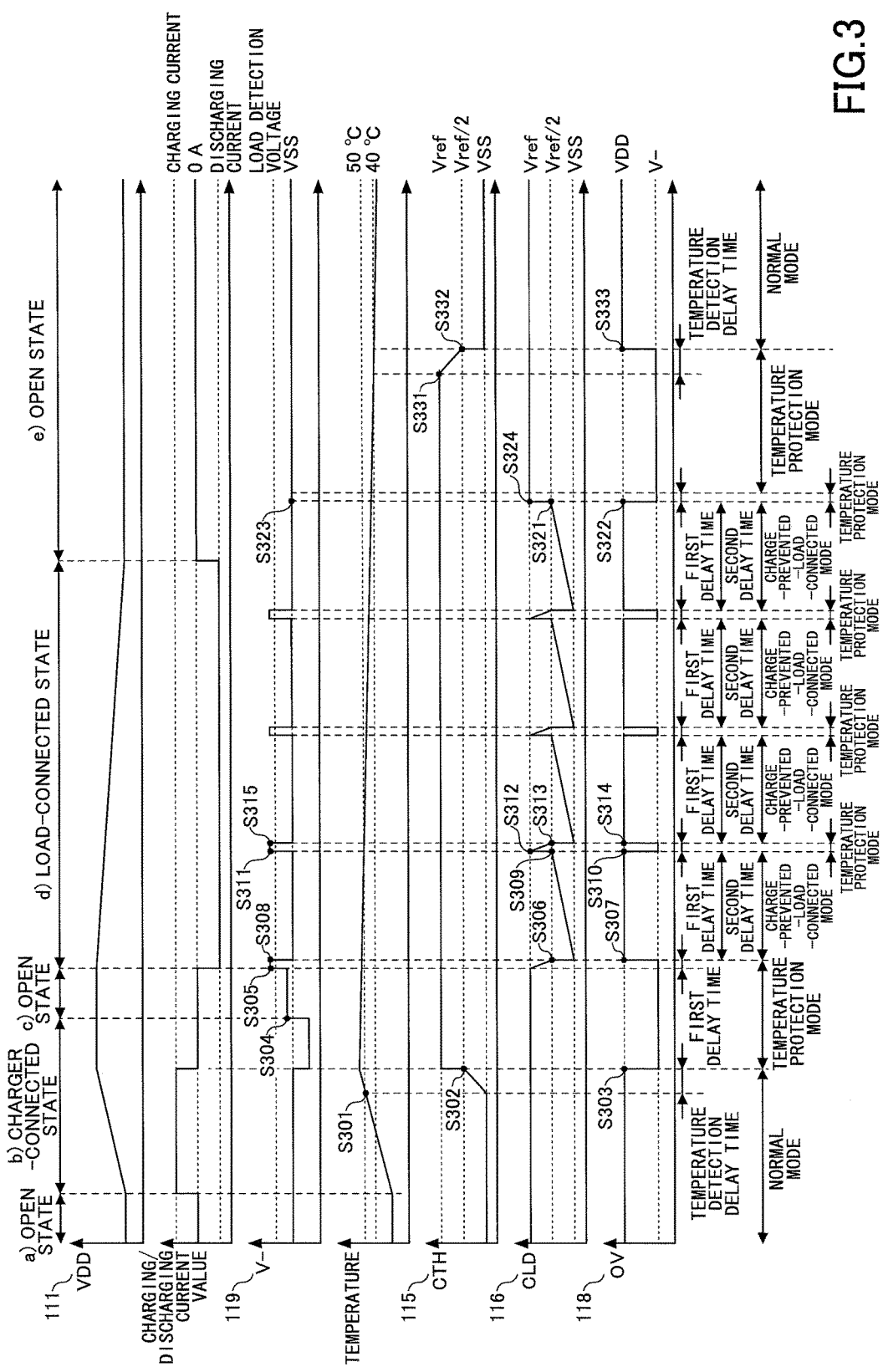
FIG. 3 is a timing chart illustrating an exemplary process in a battery pack.

Next, an exemplary process in the battery pack 140 is described. FIG. 3 is a timing chart illustrating an exemplary process in the battery pack 140. In FIG. 3, horizontal axes indicate time. Also in FIG. 3, vertical axes indicate a voltage at the VDD terminal 111, a charging/discharging current value of a charging or discharging current in the charging-discharging paths P1 and P2, a voltage at the V− terminal 119, a temperature of the secondary battery 141, a voltage at the CTH terminal 115, a voltage at the CLD terminal 116, and an output of the OV terminal 118.

In FIG. 3, it is assumed that the connection state of the input-output terminals 143 and 144 transitions as described below.
  a) Nothing is connected (open state).
  b) The charger 160 is connected (charger-connected state).
  c) Nothing is connected (open state).
  d) The load 150 is connected (load-connected state).
  e) Nothing is connected (open state).

In the open state a), no current flows through the charging-discharging paths P1 and P2, and therefore the charging/discharging current and the voltage at the V− terminal 119 are zero. Also, because there is no change to the voltage of the secondary battery 141, the voltage at the VDD terminal 111 and the voltage at the CLD terminal 116 are constant. Further, because the secondary battery 141 does not heat up, the temperature of the secondary battery 141 is also constant. At this point in time, because the temperature of the secondary battery 141 is less than the second threshold (e.g., 40° C.) and the logic unit 101 is in the normal mode, the output signal of the OV terminal 118 is at the high level.

When the connection state transitions to the charger-connected state b), a charging current flows through the charging-discharging paths P1 and P2 and charging of the secondary battery 141 is started. Accordingly, the voltage at the VDD terminal 111 increases as time passes. Also, the charging/discharging current value becomes the value of the charging current. Further, because the secondary battery 141 heats up, the temperature of the secondary battery 141 increases as time passes.

When the temperature of the secondary battery 141 becomes greater than or equal to the first threshold (e.g., 50° C.). (step S301), the voltage at the CTH terminal 115 gradually increases. Then, when the voltage at the CTH terminal 115 reaches a predetermined value (Vref/2) (i.e., when the temperature detection delay time passes), the delay circuit 103 outputs, to the logic unit 101, a signal indicating that the temperature of the secondary battery 141 has become greater than or equal to the first threshold (step S302).

When receiving the signal from the delay circuit 103, the logic unit 101 transitions to the temperature protection mode, and changes the output signal of the OV terminal 118 to the low level (step S303). As a result, charging of the secondary battery 141 is stopped, the voltage at the VDD terminal 111 becomes constant, and the charging/discharging current value becomes zero. Also, because the charger 160 is connected, the voltage at the V− terminal 119 becomes negative.

In the open state c), the voltage at the V− terminal 119 becomes zero (step S304). The voltages at the other terminals and the charging/discharging current value are the same as those observed after the logic unit 101 transitions to the temperature protection mode in the charger-connected state b). On the other hand, the temperature of the secondary battery 141 decreases as time passes because the charging has been stopped.

When the connection state transitions to the load-connected state d), the voltage at the V− terminal 119 increases and exceeds a load detection voltage (step S305), and a discharging current flows (i.e., the charging/discharging current value becomes the value of the discharging current). As a result, the voltage at the CLD terminal 116 gradually decreases. When the voltage at the CLD terminal 116 reaches a predetermined value (Vref/2) (i.e., when the first delay time passes), the delay circuit 106 outputs, to the logic unit 101, a signal indicating that the load 150 is connected (step S306).

When receiving the signal from the delay circuit 106, the logic unit 101 transitions to the charge-prevented-load-connected mode, and changes the output signal of the OV terminal 118 to the high level (step S307). As a result, electricity is discharged without using the parasitic diode 121d. When the output signal of the OV terminal 118 is changed to the high level and the NMOS transistor 121 is turned on, the voltage at the V− terminal 119 decreases.

Thus, the connection of the load 150 is detected based on the increase in the voltage at the V− terminal 119 that is caused by the discharging current. Here, the voltage at the V− terminal 119 is above the load detection voltage only for the first delay time, i.e., until the voltage at the CLD terminal 116 reaches the predetermined value and the output signal of the OV terminal 118 is changed to the high level.

Discharging of the secondary battery 141 continues while the load-connected state continues, and therefore the voltage at the VDD terminal 111 decreases as time passes. Also, because heat-up of the NMOS transistor 121 is prevented, the temperature of the secondary battery 141 also decreases as time passes.

On the other hand, the voltage at the CLD terminal 116 gradually increases as time passes. When the voltage at the CLD terminal 116 reaches the predetermined value (Vref/2) (i.e., when the second delay time passes), the delay circuit 106 outputs, to the logic unit 101, a signal indicating that a predetermined period of time has passed (step S309). When receiving the signal from the delay circuit 106, the logic unit 101 temporarily transitions to the temperature protection mode, and changes the output signal of the OV terminal 118 to the low level (step S310).

When the output signal of the OV terminal 118 is changed to the low level and the NMOS transistor 121 is turned off, the voltage at the V− terminal 119 increases due to the discharging current. Thus, by turning off the NMOS transistor 121, it becomes possible to detect the connection of the load 150 based on the voltage at the V− terminal 119 (step S311).

In the meantime, the voltage at the CLD terminal 116 gradually decreases (steps S312 and S313). When the voltage at the CLD terminal 116 reaches the predetermined value (Vref/2) (i.e., when the first delay time passes), the delay circuit 106 outputs, to the logic unit 101, a signal indicating that a predetermined period of time has passed (step S313). When receiving the signal from the delay circuit 106, the logic unit 101 transitions again to the charge-prevented-load-connected mode, and changes the output signal of the OV terminal 118 to the high level (step S314). When the output signal of the OV terminal 118 is changed to the high level and the NMOS transistor 121 is turned on, the voltage at the V− terminal 119 decreases (step S315).

As described above, in the charge-prevented-load-connected mode, the logic unit 101 temporarily transitions to the temperature protection mode after the second delay time passes and turns off the NMOS transistor 121 to determine whether the load 150 is connected (i.e., whether the discharging current is flowing). When the load 150 is connected, the voltage at the V− terminal 119 increases due to the discharging current while the NMOS transistor 121 is off. Thus, it is possible to determine whether the load 150 is connected (i.e., whether the discharging current is flowing) by monitoring the variation of the voltage at the V− terminal 119 while the NMOS transistor 121 is off.

Thereafter, the charge-prevented-load-connected mode is maintained while the load-connected state d) continues and unless the temperature of the secondary battery 141 becomes less than the second threshold (e.g., 40° C.). In the charge-prevented-load-connected mode, the logic unit 101 temporarily transitions to the temperature protection mode at predetermined intervals (i.e., every time a predetermined period of time passes), and repeatedly determines whether the load 150 is connected (i.e., whether the discharging current is flowing).

When the load 150 is disconnected and the connection state transitions to the open state e), the charging/discharging current value becomes zero and the voltage at the VDD terminal 111 becomes constant. At this point in time, because the output signal of the OV terminal 118 is at the high level, the voltage at the V− terminal 119 does not change and the logic unit 101 cannot detect that the load 150 is disconnected.

Then, when the second delay time passes (step S321), the logic unit 101 temporarily transitions to the temperature protection mode, and changes the output signal of the OV terminal 118 to the low level (step S322). When the output signal of the OV terminal 118 changes to the low level and the NMOS transistor 121 is turned off, it becomes possible to determine whether the load 150 is connected (i.e., whether the discharging current is flowing) based on the voltage at the V-terminal 119.

In this case, because the load 150 has already been disconnected, the voltage at the V− terminal 119 does not increase (step S323). Therefore, the voltage at the CLD terminal 116 also does not change and remains at Vref (step S324). As a result, the logic unit 101 remains in the temperature protection mode, and the output signal of the OV terminal 118 remains at the low level. Thus, the process where the logic unit 101 is caused to temporarily transition to the temperature protection mode every time the second delay time passes is repeated until the connection of the load 150 becomes undetectable.

Thereafter, the open state e) continues and when the temperature of the secondary battery 141 becomes less than the second threshold (e.g., 40° C.), the voltage at the CTH terminal 115 gradually decreases (step S331). Then, when the voltage at the CTH terminal 115 reaches the predetermined value (Vref/2) (i.e., when the temperature detection delay time passes), the delay circuit 103 outputs, to the logic unit 101, a signal indicating that the temperature of the secondary battery 141 has become less than the second threshold (step S332).

As a result, the logic unit 101 transitions to the normal mode, and changes the output signal of the OV terminal 118 to the high level (step S333).

Summary

As described above, the battery pack 140 of the present embodiment has the following configuration:
When the load 150 is connected to the battery pack 140 (i.e., when a discharging current flows) in the temperature protection mode, the logic unit 101 transitions to the charge-prevented-load-connected mode and changes the output signal of the OV terminal 118 to the high level to prevent electricity from being discharged via the parasitic diode 121d.
In the charge-prevented-load-connected mode, the logic unit 101 temporarily transitions to the temperature protection mode at predetermined intervals to turn off the NMOS transistor 121.
Whether the load 150 is connected (i.e., whether the discharging current is flowing) is determined by monitoring the voltage at the V− terminal 119 while the NMOS transistor 121 is off.

The above configuration makes it possible to reduce the time for which electricity is discharged via the parasitic diode 121d of the NMOS transistor 121 when the load 150 is connected to the battery pack 140 in the temperature protection mode, and thereby makes it possible to prevent the battery pack 140 from heating up. Thus, the present embodiment makes it possible to prevent heat-up, which results from discharging, of a battery pack including a secondary battery.

Second Embodiment

In the exemplary process of the first embodiment, the load 150 is disconnected while the logic unit 101 is in the charge-prevented-load-connected mode, and the disconnection of the load 150 is detected while the connection state is the open state e).

Here, when the time (the second delay time) after which the logic unit 101 temporarily transitions from the charge-prevented-load-connected mode to the temperature protection mode is long, the charger 160 may be connected to the battery pack 140 even when the logic unit 101 is in the charge-prevented-load-connected mode.

In a second embodiment, a case where the charger 160 is connected while the logic unit 101 is in the charge-prevented-load-connected mode is described.

Process in Battery Pack

Figure 4:
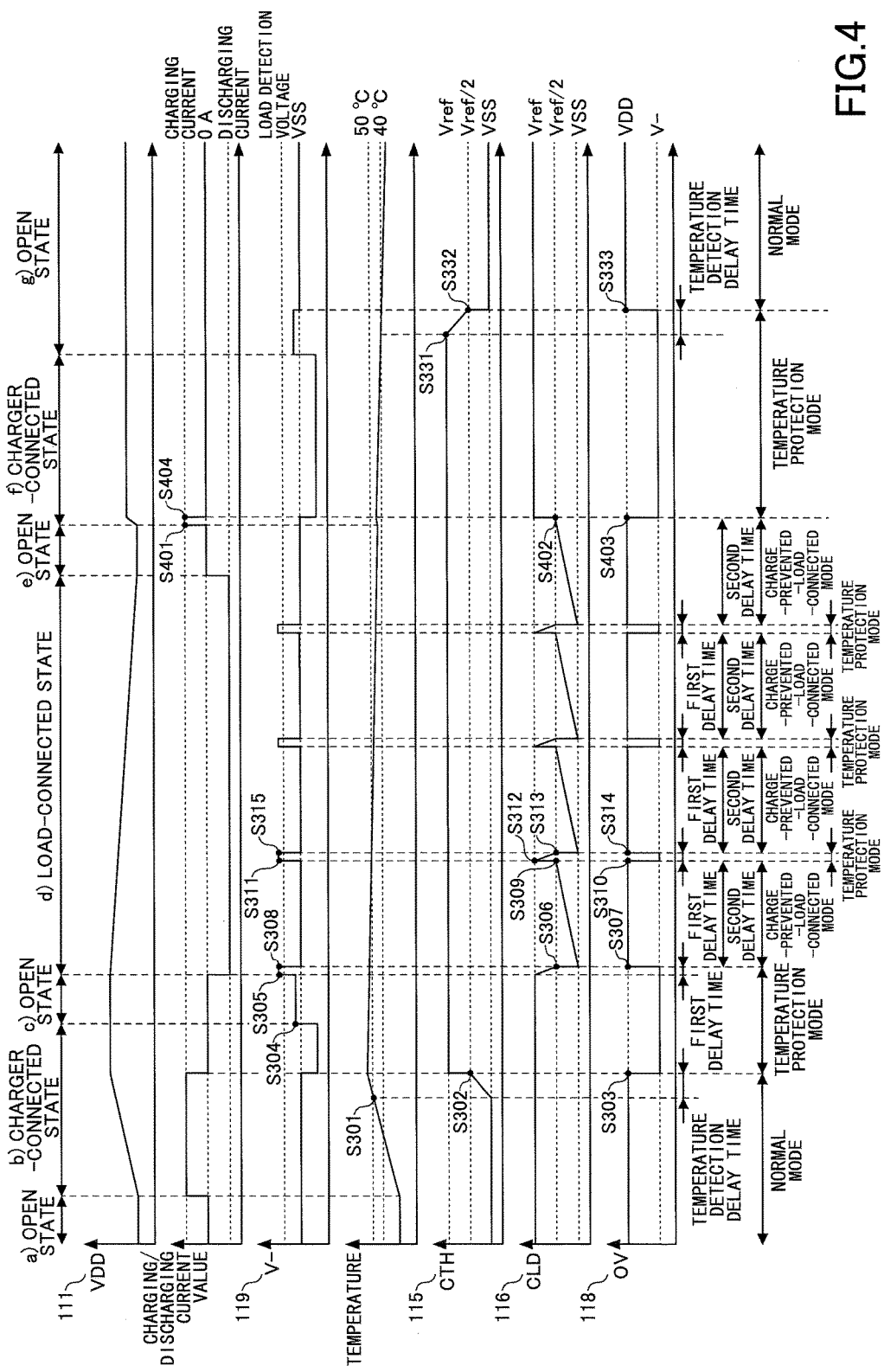
FIG. 4 is a timing chart illustrating another exemplary process in a battery pack.

FIG. 4 is a timing chart illustrating an exemplary process performed when the charger 160 is connected to the battery pack 140 during the second delay time after which the logic unit 101 temporarily transitions from the charge-prevented-load-connected mode to the temperature protection mode.

Steps in FIG. 4 performed in the open state a), the charger-connected state b), the open state c), the load-connected state d), and the open state e) are substantially the same as those in FIG. 3, and therefore their descriptions are omitted here.

The process of FIG. 4 is different from the process of FIG. 3 in that the duration of the open state e) is short, and the connection state quickly transitions to a charger-connected state f).

When the connection state changes to the charger-connected state f), because the output signal of the OV terminal 118 is at the high level and the NMOS transistor 121 is on at this point in time, a charging current flows through the charging-discharging paths P1 and P2 and charging of the secondary battery 141 is started.

As a result, the voltage at the VDD terminal 111 increases as time passes. Also, the charging/discharging current value becomes the value of the charging current (step S401). Further, because the secondary battery 141 heats up, the temperature of the secondary battery 141 increases as time passes.

When the voltage at the CLD terminal 116 reaches the predetermined value (Vref/2) (i.e., when the second delay time passes), the delay circuit 106 outputs, to the logic unit 101, a signal indicating that a predetermined period of time has passed (step S402). When receiving the signal from the delay circuit 106, the logic unit 101 temporarily transitions to the temperature protection mode, and changes the output signal of the OV terminal 118 to the low level (step S403).

When the output signal of the OV terminal 118 is changed to the low level and the NMOS transistor 121 is turned off, charging of the secondary battery 141 stops. As a result, the voltage at the V− terminal 119 becomes constant, and the charging/discharging current value becomes zero (step S404).

Thus, when the interval at which the logic unit 101 temporarily transitions from the charge-prevented-load-connected mode to the temperature protection mode is long, and the charger 160 is connected during the interval, a charging current temporarily flows. However, because this phenomenon occurs during the charge-prevented-load-connected mode (i.e., after the load 150 is connected and electricity is discharged for a while), it is unlikely that the secondary battery 141 is overcharged even when the charging current flows for a short period of time.

Also, when the load 150 is, for example, a power tool, it is unlikely that the load 150 and the charger 160 are connected to the battery pack 140 at the same time. For this reason too, the probability that the secondary battery 141 is overcharged is low.

The probability of the occurrence of the above phenomenon may be reduced by shortening the second delay time after which the logic unit 101 temporarily transitions from the charge-prevented-load-connected mode to the temperature protection mode. However, shortening the second delay time may reduce the effect of preventing the heat up of the NMOS transistor 121 resulting from discharging.

For this reason, the ratio of the second delay time (T2) that is an interval at which the logic unit 101 transitions from the charge-prevented-load-connected mode to the temperature protection mode to the first delay time (T1) for which the logic unit 101 remains in the temperature protection mode is preferably T2:T1=10:1 or greater.

Summary

As described above, the battery pack 140 of the present embodiment has the following configuration:
 To reduce the probability of occurrence of a phenomenon where a charging current temporarily flows when the charger 160 is connected during the charge-prevented-load-connected mode, the second delay time (after which the logic unit 101 temporarily transitions from the charge-prevented-load-connected mode to the temperature protection mode) is set at a length that is less than or equal to a predetermined value.
 To prevent heat-up of the NMOS transistor 121, the ratio of the second delay time (T2) (which is an interval at which the logic unit 101 transitions from the charge-prevented-load-connected mode to the temperature protection mode) to the first delay time (T1) (for which the logic unit 101 remains in the temperature protection mode) is set at T2:T1=10:1 or greater.

The above configuration of the second embodiment makes it possible to prevent heat-up, which results from discharging, of a battery pack including a secondary battery, and also makes it possible to reduce the probability that the secondary battery is overcharged.

Third Embodiment

According to the first and second embodiments, the logic unit 101 transitions to the charge-prevented-load-connected mode when the load 150 is connected to the battery pack 140 while the logic unit 101 is in the temperature protection mode. However, the present invention is not limited to the above embodiments. In addition to the temperature protection mode, the present invention may be applied to any mode where the charge preventing condition is satisfied (i.e., where the output signal of the OV terminal 118 is at the low level).

Control Modes of Logic Unit

Figure 5:
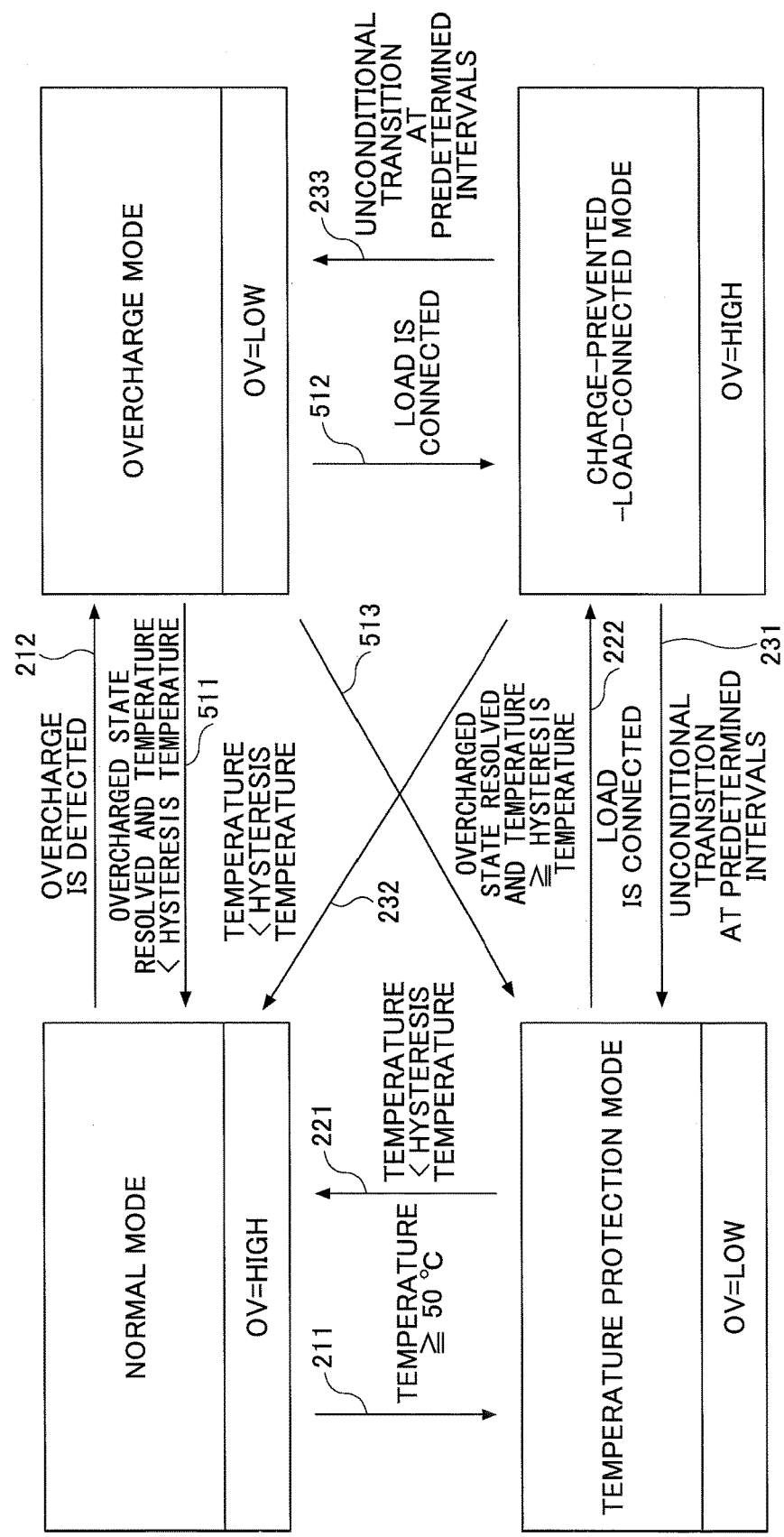
FIG. 5 is a drawing illustrating control modes of a semiconductor integrated circuit included in a battery protection module of a battery pack.
Figure 6A:
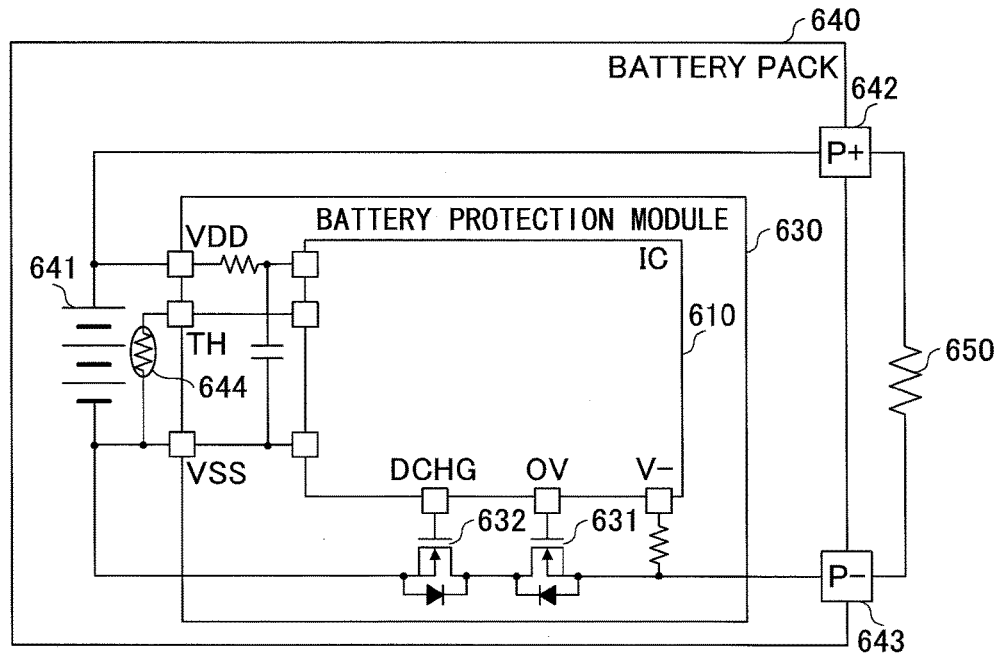
FIGS. 6A through 6C are schematic diagrams illustrating a configuration of a related-art battery pack.
Figure 6B:
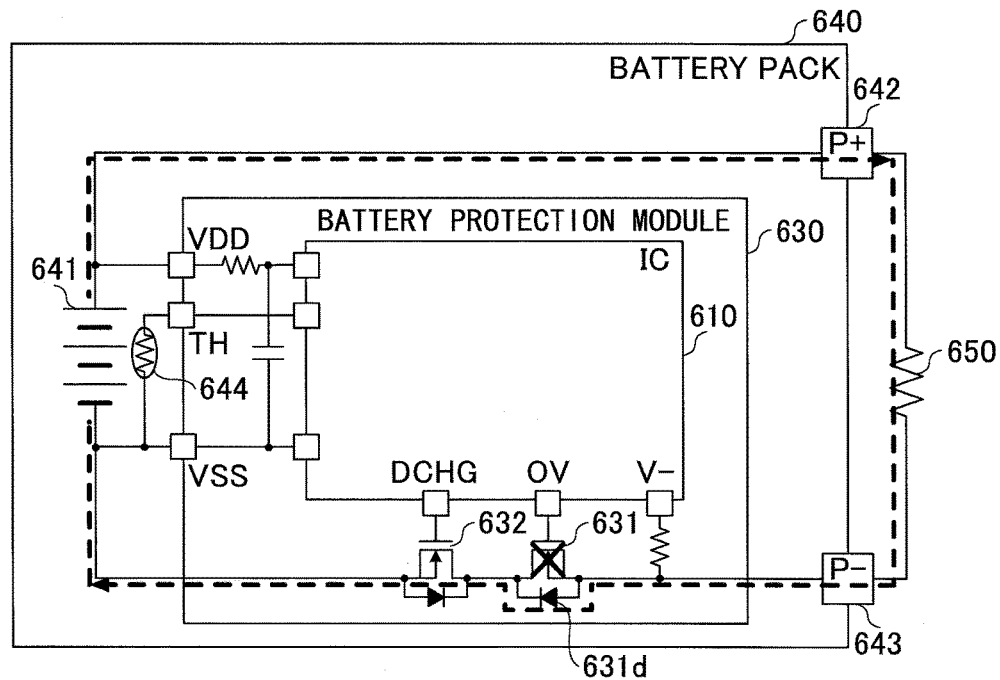
Figure 6C:
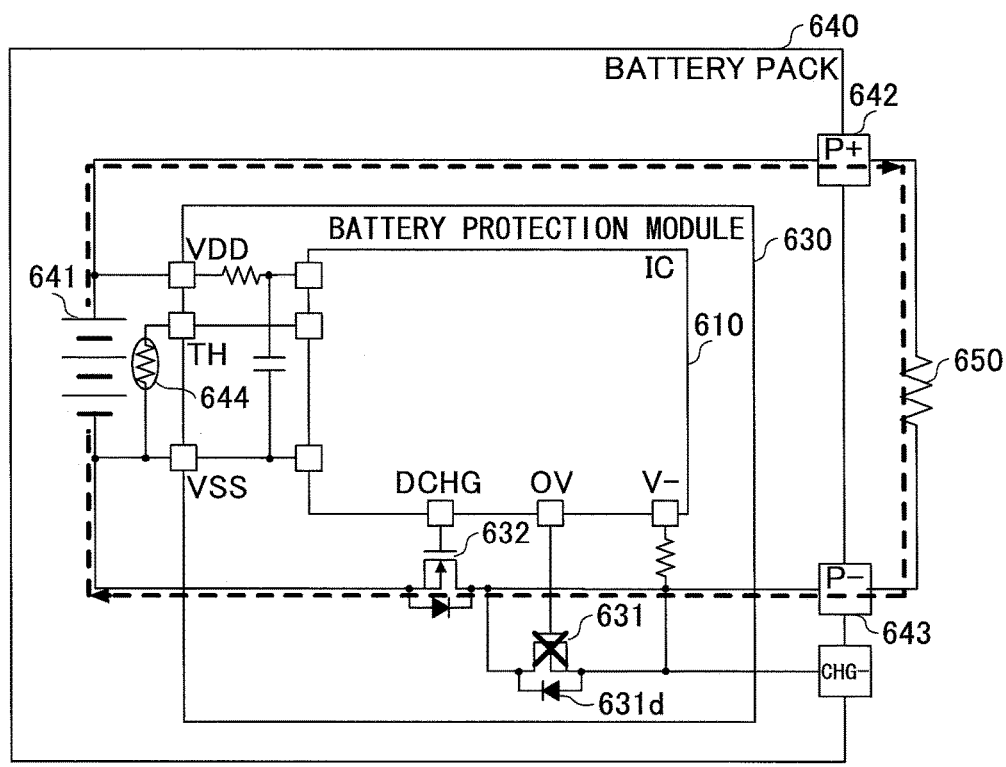

FIG. 5 is a drawing illustrating control modes of the logic unit 101. In FIG. 5, the logic unit 101 transitions to the charge-prevented-load-connected mode when the load 150 is connected to the battery pack 140 while the logic unit 101 is in an overcharge mode. Differences between FIG. 5 and FIG. 2 are mainly described below.

As illustrated by FIG. 5, the control modes of the logic unit 101 for controlling the NMOS transistor 121 include an overcharge mode, in addition to the normal mode, the temperature protection mode, and the charge-prevented-load-connected mode.

The logic unit 101 transitions to the overcharge mode (arrow 212) when overcharge is detected (i.e., when the secondary battery 141 is in an overcharged state). In the overcharge mode, the output signal of the OV terminal 118 is changed to the low level.

When the overcharged state is resolved while the logic unit 101 is in the overcharge mode, the logic unit 101 transitions to the normal mode (arrow 511), and changes the output signal of the OV terminal 118 to the high level.

When the load 150 is connected to the battery pack 140 while the logic unit 101 is in the overcharge mode, the logic unit 101 changes to the charge-prevented-load-connected mode (arrow 512), and changes the output signal of the OV terminal 118 to the high level. This configuration makes it possible to prevent electricity from being discharged via the parasitic diode 121d, and thereby makes it possible to prevent heat-up of the battery pack 140 resulting from discharging.

When the predetermined delay time (the second delay time) passes after the logic unit 101 transitions to the charge-prevented-load-connected mode, the logic unit 101 transitions to the overcharge mode (arrow 233), and changes the output signal of the OV terminal 118 to the low level again.

In the charge-prevented-load-connected mode, the logic unit 101 transitions to the overcharge mode at predetermined intervals (i.e., every time a predetermined period of time passes), and determines whether the load 150 is connected (i.e., whether the discharging current is flowing). When the load 150 is connected, the logic unit 101 transitions to the charge-prevented-load-connected mode. On the other hand, when the load 150 is not connected, the logic unit 101 remains in the overcharge mode.

Summary

As described above, the battery pack 140 of the present embodiment has the following configuration:
 When the load 150 is connected to the battery pack 140 (i.e., when the discharging current is flowing) in the overcharge mode, the logic unit 101 transitions to the charge-prevented-load-connected mode, and changes the output signal of the OV terminal 118 to the high level to prevent electricity from being discharged via the parasitic diode 121d.
 In the charge-prevented-load-connected mode, the logic unit 101 temporarily transitions to the overcharge mode at predetermined intervals to turn off the NMOS transistor 121.

Whether the load 150 is connected (i.e., whether the discharging current is flowing) is determined by monitoring the voltage at the V− terminal 119 while the NMOS transistor 121 is off.

The above configuration makes it possible to reduce the time for which electricity is discharged via the parasitic diode 121d of the NMOS transistor 121 when the load 150 is connected to the battery pack 140 in the overcharge mode, and thereby makes it possible to prevent the battery pack 140 from heating up. Thus, the present embodiment makes it possible to prevent heat-up, which results from discharging, of a battery pack including a secondary battery.

Fourth Embodiment

In the first through third embodiments described above, an element for delaying an output of the comparator 105 and an element for delaying a signal based on the voltage at the V− terminal are provided separately. However, the present invention is not limited to the disclosed embodiments. For example, these elements may be replaced by a single element.

Also in the first through third embodiments, it is assumed that the number of cells of the secondary battery 141 is three. However, the number of cells of the secondary battery 141 is not limited to three, and may be one, two, four, or more.

A protection circuit for a secondary battery, a battery protection module, a battery pack, and a method according to the embodiments of the present invention are described above. However, the present invention is not limited to the specifically disclosed embodiments, and variations and modifications may be made without departing from the scope of the present invention.

What is claimed is:

1. A protection circuit for protecting a secondary battery, the protection circuit comprising:
   a temperature detector including
      a regulator that outputs a predetermined voltage,
      a divider circuit that generates a reference voltage, and
      a comparator that compares a temperature detection voltage output from a temperature sensor with the reference voltage generated by the divider circuit to detect an abnormal temperature, the divider circuit and the temperature sensor being biased by the predetermined voltage output from the regulator;
   a controller that controls a charging path that allows a charging current to flow from a charger to the secondary battery, the charging path being disposed between a terminal of the secondary battery and an input-output terminal to which one of the charger and an electronic apparatus is connected; and
   a first delay circuit and a second delay circuit,
   wherein the controller
      determines that a charge preventing condition is satisfied when the abnormal temperature is detected by the comparator,
      closes the charging path when a first delay time measured by the first delay circuit passes after it is determined that the charge preventing condition is satisfied,
      opens the closed charging path when a discharging current from the secondary battery to the electronic apparatus is detected while the charge preventing condition is still satisfied and a second delay time measured by the second delay circuit passes after the detection of the discharging current, and
      repeatedly performs a process of
         when a first predetermined period of time measured by the second delay circuit passes after the charging path is opened while the charge preventing condition is satisfied, temporarily closing the opened charging path for a second predetermined period of time, which is measured by the second delay circuit and shorter than the first predetermined period of time, to determine again whether the discharging current is flowing, and
         when the discharging current is detected during the second predetermined period of time, opening again the charging path closed for the second predetermined period of time.

2. The protection circuit as claimed in claim 1, wherein when determining that the discharging current is not flowing during the second predetermined period of time, the controller keeps the temporarily-closed charging path closed.

3. The protection circuit as claimed in claim 1, wherein the controller repeats the process until determining that the discharging current is not flowing during the second predetermined period of time.

4. A battery protection module, comprising:
   the protection circuit of claim 1; and
   a switch that opens and closes the charging path according to a signal from the protection circuit.

5. A battery pack, comprising:
   the battery protection module of claim 4;
   the secondary battery;
   the temperature sensor; and
   the input-output terminal.

6. A method performed by a protection circuit for protecting a secondary battery, the method comprising:
   outputting a predetermined voltage by a regulator of the protection circuit;
   generating a reference voltage by a divider circuit of the protection circuit; and
   comparing, by a comparator of the protection circuit, a temperature detection voltage output from a temperature sensor with the reference voltage generated by the divider circuit to detect an abnormal temperature, the divider circuit and the temperature sensor being biased by the predetermined voltage output from the regulator; and
   controlling a charging path that allows a charging current to flow from a charger to the secondary battery, the charging path being disposed between a terminal of the secondary battery and an input-output terminal to which one of the charger and an electronic apparatus is connected,
   wherein the controlling includes
      determining that a charge preventing condition is satisfied when the abnormal temperature is detected by the comparator;
      closing the charging path when a first delay time measured by a first delay circuit of the protection circuit passes after it is determined that the charge preventing condition is satisfied;
      opening the closed charging path when a discharging current from the secondary battery to the electronic apparatus is detected while the charge preventing condition is still satisfied and a second delay time measured by a second delay circuit of the protection circuit passes after the detection of the discharging current; and
      repeatedly performing a process of
         when a first predetermined period of time measured by the second delay circuit passes after the charging path is opened while the charge preventing condition is satisfied, temporarily closing the opened charging path for a second predetermined period of time, which is measured by the second delay circuit and shorter than the first predetermined period of time, to determine again whether the discharging current is flowing, and when the discharging current is detected during the second predetermined period of time, opening again the charging path closed for the second predetermined period of time.

\* \* \* \* \*